March 6, 1962  H. L. SAXTON  3,024,441
SECTOR SCAN INDICATOR
Filed March 25, 1948  2 Sheets-Sheet 2
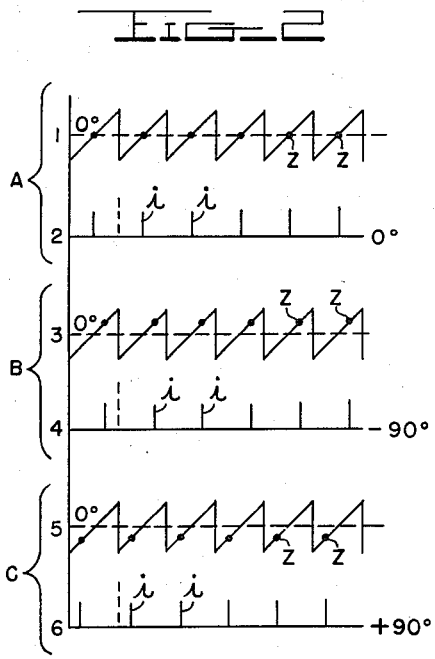
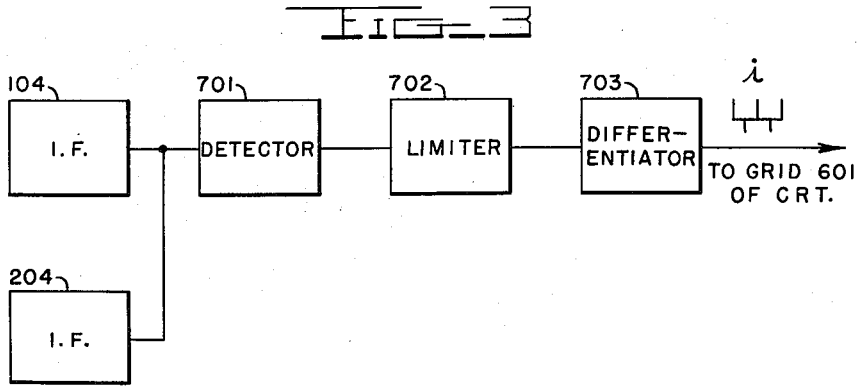
Inventor
HAROLD L. SAXTON
By
Attorney

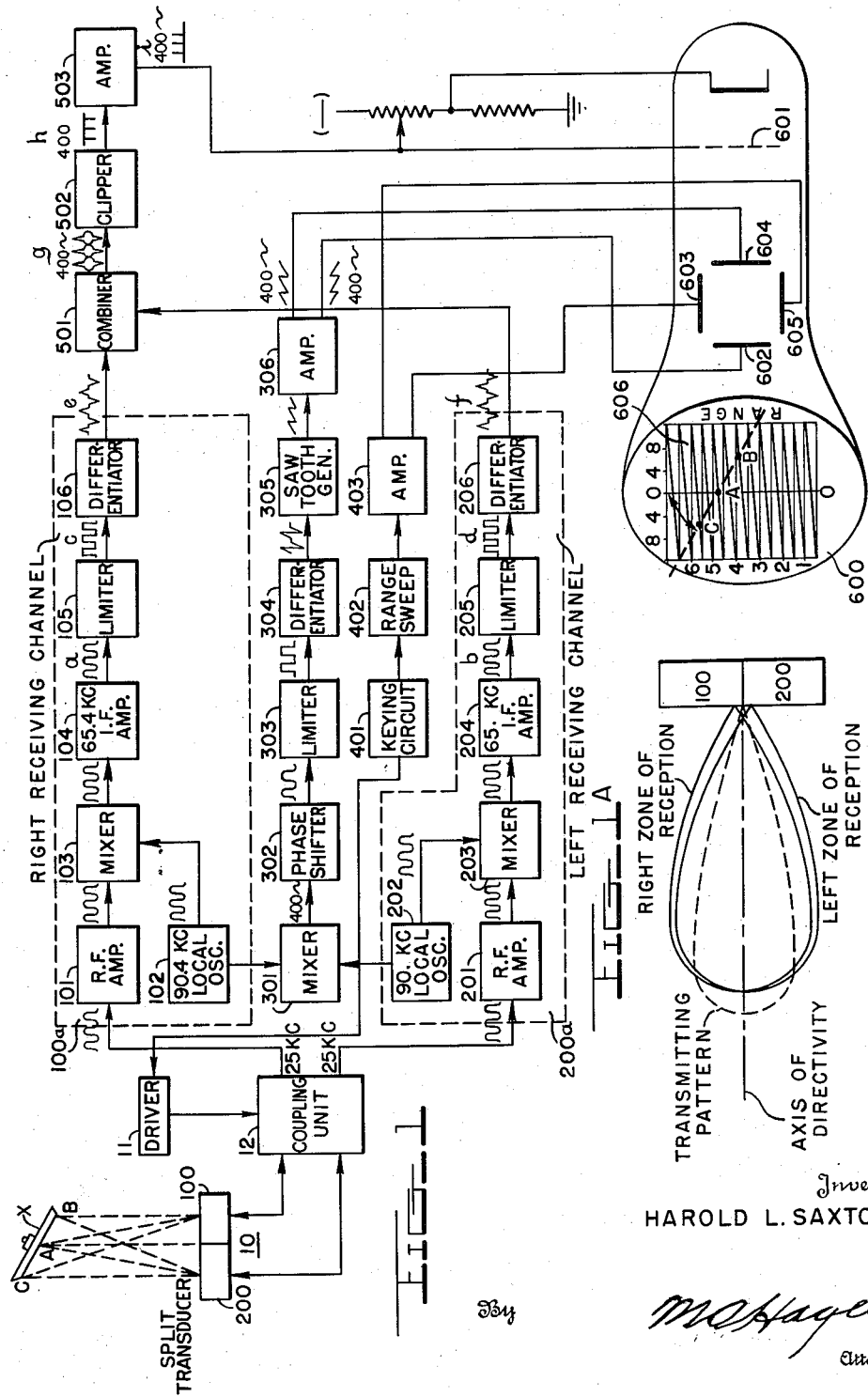

United States Patent Office 3,024,441
Patented Mar. 6, 1962

3,024,441
SECTOR SCAN INDICATOR
Harold L. Saxton, % Naval Research Laboratory,
Anacostia Station, Washington 20, D.C.
Filed Mar. 25, 1948, Ser. No. 16,893
20 Claims. (Cl. 340—6)
(Granted under Title 35, U.S. Code (1952), sec. 266)

This invention relates in general to an object or signal locator system and in particular to a pulse echo ranging and direction finding system.

In general the present invention provides, in one application, a novel object and/or signal locator system which comprises a plurality of overlapping directional zones of receptivity symmetrically disposed in opposing angular relation about an axis of symmetry or directivity. For purposes of simplification the system herein described is limited to a single pair of opposing divergent zones of receptivity disposed in azimuth and corresponding to left and right zones of reception.

Associated with each zone of receptivity is a separate superheterodyne receiving channel. Each receiving channel is equipped with an independent local oscillator which is adjusted to operate at a distinct frequency from that associated with the opposing zone. The opposing receiving channels are thus provided with distinct intermediate frequencies. Also, the local oscillators are themselves heterodyned together to yield a first difference frequency signal of reference phase. This signal is then used to produce a recurrent straight line trace of the electron beam of a cathode ray tube indicator.

In a similar manner, the intermediate frequency signal outputs from the opposing receiving channels are heterodyned together. This action produces a second difference frequency signal. The frequency of the latter signal is equal to the first difference frequency signal, but the phase thereof is a function of the relative phases of the incoming signal components synchronously appearing in the opposing receiving channels. The phase of the last mentioned signal relative to the phase of the first difference frequency signal is indicative of the direction of arrival of said incoming signal.

After suitable shaping and amplification the second difference frequency signal is applied, such as by way of the intensity grid, to the cathode ray tube indicator to thereby indicate as an intensified spot, the phase thereof relative to the phase of the first difference frequency signal and hence the direction of arrival of the incoming signal.

In operation, as will hereinafter be explained in detail, a signal arriving from a point lying on the axis of directivity produces a second difference frequency signal of a given phase relative to the phase of the first difference frequency signal. This condition is indicated on the cathode ray tube indicator as an intensified spot appearing at the mid-point of the electron beam trace. A signal arriving from the right of the axis of directivity, appears in the opposing receiving channels with such a relative phase relationship as to retard the phase of the second difference frequency signal relative to the first difference frequency signal, whereby the indication appearing on the sweep is displaced to the right of the mid point of the sweep thus indicating "off bearing to the right." Conversely, a signal arriving from the left of the axis of directivity advances the phase of the second difference frequency signal relative to the first difference frequency signal; whereby the resulting indication appears displaced to the left of the mid point of the sweep, thus indicating "off bearing to the left."

In application of the present invention to pulse echo techniques, wherein a pulse transmitter is incorporated in the system and echo signals are derived from transmitting recurrent power pulses to detect object range, some means for measuring the time interval between the transmission of a pulse and receipt of an echo is needed. This function is incorporated in the same indicator used to detect bearing and is accomplished by sweeping the electron beam in a direction normal to the abovementioned bearing trace in synchronism with the transmission of a pulse. The bearing traces are performed at a rate much greater than the range sweep thus providing a scan similar to that employed in standard television receiving systems. In the preferred embodiment, range is indicated along the vertical axis of the face of the indicator and bearing by left and right displacement from the vertical center line of the tube.

Accordingly, an object of this invention is to provide a new and improved signal and/or object locator system.

Another object of this invention is to provide a new and improved pulse echo system for determining the range and bearing of remote objects.

Another object of this invention is to provide a new and improved phase indicator mechanism for use in the present invention.

Further objects and features of the present invention will become apparent upon a careful consideration of the following detailed description when read in conjunction with the accompanying drawings, in which:

FIG. 1 is a schematic diagram of one typical embodiment of this invention;

FIG. 2 shown a series of wave forms used in explaining the operation of the invention, and FIG. 3 is a schematic diagram of an alternative embodiment for producing an intensifying pip.

For purposes of clarity, the present invention will be described in connection with a sound pulse echo detection system, it being understood that the principles herein disclosed readily lend themselves to other applications in the art. For example, the present invention may be used to indicate the phase relationship of any pair of input signals subject to arbitrary phase shifts.

It will also be understood from the following description that the use of the term "aspect" or "aspect angle" is intended to mean the angle between the projector heading and the target course.

Referring now in particular to FIG. 1 there is disclosed the teachings of my invention as applied to a sound echo ranging device. This particular embodiment comprises a transducer 10, operative to produce right and left overlapping zones of reception; left and right receiving channels 200a and 100a associated with the corresponding zones of receptions; left and right local oscillators 202 and 102, and finally a cathode ray indicating tube 600. The transducer illustrated at 10 is of conventional design split into a left element 200 and right element 100, operative to form a single search light beam on transmission and right and left overlapping zones of reception for echos or signals.

In function the transducer operates to convert the periodically recurring pulses of electrical energy obtained from the output of the driver 11 into pulses of sound energy, and during reception operates to convert sound energy into electrical energy.

The coupling unit illustrated at 12, isolates the driver 11 electrically from the transducer during reception intervals and protects the receiving channels 200 and 100 from driver 11 during transmission. The coupling unit 12 also combines the right and left elements 100 and 200 of the transducer to render simultaneous output of the whole transducer, with each transmitted pulse.

The organization of the transmitting and receiving pattern provided by transducer 10 is shown in a general way in FIG. 1a.

As aforementioned, object bearing is indicated by a horizontal scan on the indicator 600. The production of this trace and the apparatus used therefor will now be described. In general the components used for the production of this scan are designated in the drawing by reference characters in the 300 series. More particularly, local oscillator 102 of the right superheterodyne receiving channel and local oscillator 202 of the left superheterodyne receiving channel are, as aforementioned, tuned to distinct frequencies, and their respective outputs are heterodyned together in a suitable mixer 301. By way of example, oscillator 102 is tuned to 90.4 kilocycles and oscillator 202 is tuned to 90 kilocycles. The resulting 400 cycle frequency difference output from mixer 301 is fed through a phase shifter 302, to a limiter 303 for squaring the sinusodial output from the phase shifter, then to a differentiating 304 circuit for further distorting the wave shape to periodic peaks or pips and finally to a saw-tooth generator 305. Generator 305 operates in response to and in synchronism with the output of the differentiator 304 to produce a 400 cycle horizontal sweep trace on the face of indicator 600. Amplifier 306 couples the saw-tooth sweep voltage obtained from generator 305 to the horizontal deflecting plates 602 and 604. The resulting beam trace is preferably linear and sweeps from left to right in synchronism with the 400 cycle output from the differentiator 304.

In practice phase shifter 302, which may be any suitable device known to the art, is used to provide the horizontal sweep trace on the face of tube 600 with a reference phase, whereby received signals arriving from the point lying on the axis of directivity will be indicated by an intensified spot appearing at the mid point of the horizontal trace. In particular, this phasing can be accomplished by obtaining reflections from a dummy target or other device disposed on the axis of directivity and adjusting the phase output from shifter 302 until the echo indication produced thereby is centered on the horizontal electron beam trace. In this condition the electron beam spot passes through the center of its trace when the signal outputs from oscillators 102 and 202 are simultaneously passing through zero phase.

To indicate object range, the 400 cycle horizontal bearing trace is stretched out in a vertical plane to produce a television scan. The range axis is along the vertical axis of the face of the tube. For this purpose the components designated by reference characters of the 400 series are added, and comprise a keying circuit 401 operative to produce synchronizing impulses for producing simultaneous operation of driver 11 and range sweep generator 402, the latter produces a saw-tooth sweep of 4 or 5 seconds duration for example. In detail, keying circuit 401 may be any sort of low frequency pulse generator operative to actuate driver 11 and to simultaneously initiate the production of a saw-tooth voltage from range sweep generator 402. The voltage output from generator 402 is amplified by amplifier 403 and applied as a push-pull linear deflection signal to the vertical deflecting plates 603 and 605 of indicator 600. This current is so synchronized with the transmission or the projection of the pulses that the horizontal lines are deflected to the bottom of the screen of the indicating tube 600 at the instant of pulse transmission and thereafter progress upwardly at a uniform rate in such a manner that a rectangular area or raster is produced similar to that in television. The vertical displacement from the bottom is therefore proportional to range. The range proportionality constant may be chosen to make the top of the screen of the cathode ray tube indicator 600 correspond to any desired range.

The two oscillators 102 of right channel and 202 of the left channel, previously referred to, are two local oscillators of left and right superheterodyne receiving channels 200a and 100a. When a returning echo is received from the axis of directivity of the transducer, as represented by point A of target X, or from other transmitted noise such as from a propeller, the left element 200 and the right element 100 of the transducer respond simultaneously, initiating a simultaneous series of actions in the left and right superheterodyne receiving channels respectively. The signal from the right element 100 of the transducer 10 is fed into the channel with the oscillator of higher frequency. In the superheterodyne mixer 103 phases, as well as frequencies, are subtracted. Thus if the two incoming signals from the left and right elements 200 and 100 of the transducer 10 are in phase, which they are when received from a point lying on the aixs of directivity, the two intermediate frequencies have a relative phase identical with that of the local oscillators when heterodyned to produce a horizontal sweep on the cathode ray tube.

Referring for the moment to FIG. 2, the above action is illustrated at wave form A. The saw-tooth wave forms A1, B3 and C5 are representative of the horizontal bearing sweep voltages for the indicating tube 600. The sharp pips $i$ of wave forms A2, B4 and C6 below the saw-tooth wave forms are obtained in the following manner: The outputs designated at $a$ and $b$ of each intermediate frequency amplifier 104 and 204 of FIG. 1 are limited by driving the grids of amplifiers below cutoff in limiter circuit 105 of the right channel and limiter circuit 205 of the left channel, thereby producing square waves $c$ and $d$. The square waves at their respective intermediate frequencies, are differentiated in the differentiator circuit 106 of right channel and 206 of the left channel, to produce sharp voltage pips $e$ and $f$. The voltage pips $e$ and $f$ in the two channels, still at intermediate frequencies are added together in the combiner circuit 501 to produce extra high pips $g$, when the voltage pips $e$ and $f$ occur at the same instant, as they do at a rate of 400 cycles per second. Only these extra high pips $g$ pass through an amplifier biased below cutoff in the clipper circuit 502, producing a unilateral 400 cycle pip $h$. After proper filtering, inverting and amplifying in amplifier 503 these sharp pips $i$, and more clearly illustrated by again referring to FIG. 2, are applied to the intensity grid 601 of the cathode ray tube indicator 600. As previously indicated when the left and right halves of the transducer receive the signal simultaneously, as they would if the signal originated from the axis of directivity of the transducer 10, the two intermediate frequencies have a relative phase identical with that of the local oscillators. That is, the phase coincidence of the two intermediate frequencies equals the phase coincidence of the two local oscillators. This condition is shown in wave forms A of FIG. 2. The intensifying pip produces a brightened spot that falls on the center of the horizontal saw-tooth sweep. This brightened spot on center line of the indicating oscilloscope is representative of zero bearing of the target, as the signals are received from the axis of directivity of the split transducer.

When a signal is received from point B of target X, that is to say for example, displaced angularly to the right of the axis of directivity of the split transducer 10, the signal reaches the right element of the transducer 100 before it reaches the left element 200, giving rise to a phase lead in the right element response ahead of the left element response which is assumed as an example to be 90 electrical degrees. Then, because of subtraction of phases in the mixers 103 and 203, the intensifying pips $i$ have a retarded phase relative to that for a signal from point A. When the horizontal sweep on the indicating tube 600 has progressed from center intermediate to the right, the two intermediate frequencies are at phase coincidence and the resulting voltage pips $i$ applied to the intensifying grid 601 brightens a spot at a point intermediate the center and the extreme right end of the saw-tooth sweep. This condition is shown at B in FIG. 2.

When a signal is received from point C of target X, that is to say for example again, displaced angularly to the left of the axis of directivity of the split transducer, the signal reaches the left half of the transducer before it reaches the right half, giving rise to a phase lag in the right half response behind that of the left half response. Then, again because of subtraction of phases in the mixers 103 and 203 the intensifying pips $i$ have an advanced phase. When the horizontal sweep on the indicating tube 600 has progressed from extreme left intermediate to the center, the two intermediate frequencies are at phase coincidence, and the resulting voltage pips $i$ applied to the intensifying grid 601 brightens a spot intermediate the extreme left and center.

Now referring again to FIG. 2 an illustration can be shown of the instances wherein the resulting phase of the two intermediate frequencies leads and lags that of the horizontal sweep. A of FIG. 2 has been previously referred to, where the phase coincidence, of the intermediate frequencies, is identical to that of the horizontal sweep giving rise to a brightened spot on zero center of the horizontal sweep. This condition is indicated by the dots $z$ appearing at the center of the saw-tooth sweep of wave form 1. B is an illustration as just described where the signal received is to the right of the axis of directivity of the split transducer, as for example from B of target X in FIG. 1. The relative phase of the intermediate frequencies, illustrated by 4 as sharp pips, lags that of the horizontal sweep 3, giving a brightened spot $z$ on the horizontal sweep intermediate the center and extreme right. C is an illustration where the signal received is to the left of the beam axis of the split transducer, as for example again from C of target X of FIG. 1. The relative phase of the intermediate frequencies, illustrated at 6, leads that of the horizontal sweep 5, giving a brightened spot $z$ on the horizontal sweep intermediate the center and extreme left.

The apparatus of FIG. 1 illustrates only one way of producing the indicating pips $i$. Other arrangements are known and can be employed without departing from the spirit of the invention.

For example, a modified embodiment of the invention which gives an improved presentation is shown in FIG. 3. That part of the right channel which includes the R.F. amplifier 101, the mixer 103, the local oscillator 102, the I.F. amplifier 104, and the corresponding part of the left channel numbered 201 to 204 inclusive, remain exactly the same as in FIG. 1. The outputs of the intermediate frequency amplifiers 104 and 204 are fed into a detector 701, such as a diode detector, where they are heterodyned against each other to give a difference frequency. This difference frequency is then limited in the limiter 702 to give a square wave form which in turn is differentiated in the differentiator circuit 703 to produce intensifying pips, these pips are fed directly to the intensifier grid 601 of cathode ray tube 600 of FIG. 1 without the negative pips being clipped as the cathode ray tube is already operating below cutoff, hence the negative pips have no effect. In the embodiment illustrated in FIG. 3, as in that of FIG. 1, spot brightening occurs at instances of phase coincidence of the two intermediate frequency signals, in a manner identical to that described in relation to FIG. 1.

Again referring to FIG. 1, the indication produced by the target X is shown on the fluorescent screen 606 of the indicating tube 600. The diagonal lines on the fluorescent screen are for the sake of illustrating the saw-tooth horizontal sweep, and the fly back as straight horizontal lines. Actually, since the horizontal sweep is 400 cycles per second or more, depending on the difference in local oscillator frequency, there is very little definition on the screen, and during normal operation the screen is blanked, except for the occurrence of an echo. The vertical plane of the screen is calibrated, as illustrated, to correspond to the range sweep, to yield a reading of the range of the target. The horizontal plane of the screen is calibrated in degrees to give the relative bearing of a target. Dots A, B and C on the raster, that is the television scan, simulate the three signals received from points A, B and C of target X as previously described. Signal A of target X is on center bearing, signal B is displaced at a point intermediate the center and extreme right and signal C is displaced at a point intermediate the center and extreme left, presenting a proportional deflection on the raster of the signals received from target X. The range of each signal or echo is determined by the time lapsed as calibrated with the vertical range sweep to present the range of each echo. As shown on the raster 606, the echoes are of a different range. In actual echo ranging the echoes are not limited to three but are of a high number giving a solid series of echoes over the area between C and B.

To illustrate another feature of my invention imagine for the moment a solid series of echoes between the points C and B. A line definition drawn through their centers will be apparent in actual operation. Here, for the sake of illustration, a dotted line is drawn through their center. The aspect angle is illustrated at 608, that is the angle between the transducer heading which is represented as zero bearing on the raster, and the target course, may be read directly from the raster in degees, provided a certain relationiship of target indication position on the screen and range sweep rate is satisfied, such as described in the copending application of Harold L. Saxton and Melvin S. Wilson, Serial No. 16,894 filed March 25, 1948. To use another expression the raster would then present a television picture of the detected target on the indicating oscilloscope, from which the target course may be read directly.

Although I have shown and described only a certain and specific embodiment of the present invention it must be understood that I am fully aware that many modifications are possible thereof without departing from the true spirit of the disclosure.

The invention described herein may be manufactured and used by or for the Government of the United States of America for governmental purposes without the payment of any royalties thereon or therefor.

What is claimed is:

1. A locator system, comprising means to provide at least one pair of directional overlapping zones of receptivity disposed in oppositely diverging relation about an axis of directivity, separate superheterodyne receiving channels for each zone of receptivity, including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, means combining the intermediate frequency signals derived from opposing receiving channels thereby to produce a second difference frequency signal whose phase relative to the local oscillator difference signal is governed by the direction of arrival of an incoming signal, and means indicating the phase relationship of said second difference frequency signal and said first difference frequency signal.

2. A locator system, comprising means to provide at least one pair of directional overlapping zones of receptivity disposed in oppositely diverging relation about an axis of directivity, separate superheterodyne receiving channels for each zone of receptivity including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, a cathode ray tube indicator, means deflecting the electron beam of said cathode ray tube in response to and in synchronism with said first difference frequency signal, means combining the intermediate frequency signals derived from opposing receiving channels thereby to produce a second difference frequency signal whose phase relative to the local oscillator difference signal is governed by the direction of arrival of an incoming signal, and means applying said second difference frequency signal to said cathode ray tube to indicate the phase thereof relative to the phase of the first difference signal.

3. A locator system, comprising means to provide at least one pair of directional overlapping zones of receptivity disposed in oppositely diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, a cathode ray tube indicator, means deflecting the electron beam of said cathode ray tube in response to said difference frequency signal, means converting the intermediate frequency signals of opposing receiving channels into pulse signals, means including mixer means for combining the intermediate frequency pulses of opposing channels to derive a pulse difference frequency signal whose phase relative to the first difference frequency signal is governed by the direction of arrival of an incoming signal, and means applying said pulse difference frequency signal to said cathode ray tube to indicate the phase thereof relative to the phase of the first difference signal.

4. A locator system, comprising means providing at least one pair of directional overlapping zones of receptivity disposed in oppositely diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning the local oscillator signals of opposing channels thereby to yield a local oscillator difference signal, a cathode ray tube indicator including a beam intensifying electrode, means deflecting the electron beam of said indicator in response to said local oscillator difference signal, means converting the intermediate frequency signals of said channels into pulse signals, means including mixer means for combining the intermediate frequency pulse signals of opposing channels to derive a pulse frequency difference signal whose phase relative to the local oscillator difference signal is governed by the direction of arrival of an incoming signal, and means applying said pulse frequency difference signal to the intensifying electrode of said cathode ray tube indicator to indicate the phase thereof relative to the phase of the local oscillator difference signal.

5. A locator system, comprising means providing at least one pair of directional overlapping zones of receptivity disposed in oppositely diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning the local oscillator signals of opposing channels thereby to yield a local oscillator difference signal, a cathode ray tube indicator including a beam intensifying electrode, saw-tooth generating means operative responsive to said local oscillator difference signal to produce a straight line trace of the electron beam of said cathode ray tube indicator, means for giving said trace a reference phase, means converting the intermediate frequency signals of said channels into pulse signals, means including mixer means for combining the intermediate frequency pulse signals of opposing channels to derive a pulse frequency difference signal whose phase relative to the local oscillator difference signal is governed by the direction of arrival of an incoming signal, and means applying said pulse frequency difference signal to the intensifying electrode of said cathode ray tube indicator to indicate the phase thereof relative to the phase of the local oscillator difference signal.

6. A pulse echo locator system, comprising means for transmitting periodic impulses to remote objects, means for receiving the reflections therefrom comprising apparatus for providing at least one pair of directional overlapping zones of receptivity disposed in oppositely diverging relation about an axis of directivity, separate superheterodyne receiving channels for each zone of reception, including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, means combining the intermediate frequency signals derived from opposing receiving channels to produce a second difference frequency signal whose phase relative to the first difference frequency signal is governed by the direction of arrival of an incoming signal, and means indicating the phase relationship of said intermediate frequency difference signal and first difference frequency signal.

7. A pulse echo locator system, comprising means for transmitting periodic impulses to remote objects, means for receiving the reflections therefrom comprising apparatus for providing at least one pair of directional overlapping zones of receptivity disposed in oppositely diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, a cathode ray tube indicator, means deflecting the electron beam of said cathode ray tube in response to said difference frequency signal, means combining the intermediate frequency signals derived from opposing receiving channels to produce a second difference frequency signal whose phase relative to the first difference signal is governed by the direction of arrival of an incoming signal, and means applying said intermediate frequency difference signal to said cathode ray tube to indicate the phase thereof relative to the phase of the first difference frequency signal.

8. A pulse echo locator system, comprising means for transmitting periodic impulses to remote objects, means for receiving the reflection therefrom, comprising apparatus for providing at least one pair of directional overlapping zones of receptivity disposed in oppositely diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, a cathode ray tube indicator, means deflecting the electron beam of said cathode ray tube in response to said difference frequency signal, means converting the intermediate frequency signals of opposing receiving channels into pulse signals, means including mixer means for combining the intermediate frequency pulses of opposing channels to derive a pulse frequency difference signal whose phase relative to the first difference frequency signal is governed by the direction of arrival of an incoming signal, and means applying said pulse frequency difference signal to said cathode ray tube to indicate the phase thereof relative to the phase of the first difference frequency signal.

9. A pulse echo locator system, comprising means for transmitting periodic impulses to remote objects, means for receiving the reflections therefrom, comprising apparatus for providing at least one pair of directional overlapping zones of receptivity disposed in oppositely diverging relation about an axis of directivity, separate superheterodyne receiving channels for each zone of receptivity including separate local oscillators therefor the local oscillators of opposing receiving channels being tuned to distinct frequencies of operation whereby said opposing receiving channels are endowed with distinct intermediate frequencies, means heterodyning the local oscillator signals of opposing channels thereby to yield a first difference frequency signal, a cathode ray tube indicator including a beam intensifying electrode, means deflecting the electron beam of said indicator in response to said first difference frequency signal, means converting the intermediate frequency signals of said channels into pulse signals, means including mixer means for combining the intermediate frequency pulse signals of opposing channels to derive a pulse frequency difference signal whose phase relative to the local oscillator difference signal is governed by the direction of arrival of an incoming signal, and means applying said pulse frequency difference signal to the intensifying electrode of said cathode ray tube indicator to indicate the phase thereof relative to the phase of the first difference frequency signal.

10. A pulse echo locator system comprising, means for transmitting periodic impulses to remote objects, means for receiving the reflections therefrom, comprising apparatus for providing at least one pair of directional overlapping zones of receptivity oppositely disposed in diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing channels thereby to yield a first frequency difference signal, cathode ray tube indicator means, means operative to deflect the electron beam of said cathode ray tube in one direction synchronously with the transmission of said impulses, means operative to deflect the electron beam of said cathode ray tube beam in a second direction at right angles to the first direction in response to said first difference frequency signal, means combining the intermediate frequency signals derived from opposing receiving channels to produce a second difference frequency signal whose phase relative to the local oscillator difference signal is governed by the direction of arrival of the reflected energy, and means applying said second difference frequency signal to said cathode ray tube indicator means to indicate object range and bearing.

11. A pulse echo locator system comprising, means for transmitting periodic impulses to remote objects, means for receiving the reflections therefrom, comprising apparatus for providing at least one pair of directional overlapping zones of receptivity oppositely disposed in diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing channels thereby to yield a local oscillator difference signal, a cathode ray tube indicator means, means operative to deflect the electron beam of said cathode ray tube in one direction synchronously with the transmission of said impulses, means operative to deflect the electron beam of said cathode ray tube beam in a second direction at right angles to the first direction in response to said first difference frequency signal, means for converting the intermediate frequency signals of said opposing receiving channels into pulse signals, means including mixer means for combining the intermediate frequency pulse signals of opposing channels to derive a pulse frequency difference signal whose phase relative to the local oscillator difference signal is governed by the direction of arrival of the reflected energy, and means applying said pulse frequency difference signal to said cathode ray tube indicator means to indicate object range and bearing.

12. A pulse echo locator system comprising, means for transmitting periodic impulses to remote objects, means for receiving the reflections therefrom, comprising apparatus for providing at least one pair of directional overlapping zones of receptivity oppositely disposed in diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing channels thereby to yield a first difference frequency signal, cathode ray tube indicator means, saw-tooth generating means operative to deflect the electron beam of said cathode ray tube in one direction synchronously with the transmission of said impulses, saw-tooth generating means operative responsive to said first difference frequency signal to produce a straight line trace of electron beam of said cathode ray tube indicator in a second direction at right angles to the first direction, means for converting the intermediate frequency signals of said opposing receiving channels into pulse signals, means including mixer means for combining the intermediate frequency pulse signals of opposing channels to derive a pulse frequency difference signal whose phase relative to the first difference signal is governed by the direction of arrival of the reflected energy, and means applying said pulse frequency difference signal to said cathode ray tube indicator means to indicate object range and bearing.

13. In a system for indicating the phase relationship between a pair of input signals, the combination of, a pair of superheterodyne amplifier channels including a separate local oscillator for each, said oscillators being tuned to distinct frequencies of operation whereby said channels are endowed with distinct intermediate frequencies, means applying each signal of the pair of input signals to a respective one of said pair of amplifier channels, means heterodyning the local oscillator signals together to yield a first difference frequency signal of reference phase, a cathode ray tube indicator means, means to produce a trace of the electron beam of said cathode ray tube responsive to said first difference frequency signal, means heterodyning together the intermediate frequency signals derived from the respective amplifier channels to produce a second difference frequency signal whose phase relative to the first difference frequency signals is a function of the phase relationship of the original pair of signals, and means applying said second difference signal to said cathode ray tube indicator means to indicate the phase thereof relative to the phase of the first difference frequency signal.

14. In a system for indicating the phase relationships between a pair of input signals; the combination of, a pair of superheterodyne amplifier channels including a separate local oscillator for each, said oscillators being tuned to distinct frequencies of operation whereby said channels are endowed with distinct intermediate frequencies, means applying each signal of the pair of input signals to a respective one of said pair of amplifier channels, means heterodyning the local oscillator signals together to yield a first difference frequency signal of reference phase, a cathode ray tube indicator means, saw-tooth generating means operative to produce a trace of the electron beam of said cathode ray tube in synchronism with and responsive to said first difference frequency signal, means heterodyning together the intermediate frequency signals derived from the respective amplifier channels to produce a second difference frequency signal whose phase relative to the first difference frequency signal is a function of the phase relationship of the original pair of signals, and means applying said second difference signal to said cathode ray tube indicator means to indicate the phase thereof relative to the phase of the first difference frequency signal.

15. In a system for indicating the phase relationship between a pair of input signals; the combination of, a pair of superheterodyne amplifier channels including a separate local oscillator for each, said oscillators being tuned to distinct frequencies of operation whereby said channels are endowed with distinct intermediate frequencies, means applying each signal of the pair of input signals to a respective one of said pair of amplifier channels, means heterodyning the local oscillator signals together to yield a first difference frequency signal of reference phase, a cathode ray tube indicator means including a beam intensifying electrode, saw-tooth generating means operative to produce a trace of the electron beam of said cathode ray tube in synchronism with and responsive to said first difference frequency signal, means heterodyning together the intermediate frequency signals derived from the respective amplifier channels to produce a second difference frequency signal whose phase relative to the first difference frequency signal is a function of the phase relationship of the original pair of signals, and means applying said second difference signal to said beam intensifying electrode of said cathode ray tube indicator means to indicate the phase thereof relative to the phase of the first difference frequency signal.

16. In an object detecting and locating system having two coplanar transducers and means to display the azimuth as a function of the phase difference in signals generated by said transducers in response to a signal from an object, a dual receiving channel system between said cooplanar transducers and said display means, comprising a first converter means including a first oscillator to translate the output from one of said transducers to a first frequency, a second converter means including a second oscillator to translate the output from the other of said transducers to a second frequency, means to detect the frequency difference of said first and second frequencies, means to apply said difference frequency to said display means to be displayed thereon, means to detect oscillations having a stable frequency from said first and second oscillators which oscillations have the same frequency as said frequency difference, means to generate a sweep voltage responsive to said oscillations having a stable frequency, and means to apply said sweep voltage to said display means.

17. A system for indicating the phase relationship between a pair of input signals comprising a pair of respective local oscillators having respectively different output frequencies, means for mixing the outputs of said local oscillators to produce a reference phase signal having a frequency equal to the difference between said local oscillator output frequencies, means for mixing each respective local oscillator output with a respective input signal to produce a respective first difference frequency signal, means for mixing said respective first difference frequency signals to produce a second difference frequency signal, and means for periodically indicating the phase difference between said reference phase signal and said second difference frequency signal.

18. A system for indicating the phase relationship between a pair of input signals comprising a pair of respective local oscillators having respectively different output frequencies, means for mixing the outputs of said local oscillators to produce a reference phase signal having a frequency equal to the difference between said local oscillator output frequencies, means for mixing each respective local oscillator output with a respective input signal to produce a respective first difference frequency signal, means for mixing said respective first difference frequency signals to produce a second difference frequency signal, a cathode ray tube indicator including an electron beam, means periodically sweeping the electron beam of the cathode ray tube in a first direction responsive to said reference phase signal, means for converting said second difference frequency signal to a pulse waveform of the same frequency, means intensifying said electron beam responsive to said pulse waveform, and means for sweeping said electron beam in a direction normal to said first direction at a frequency low relative to that of said reference phase signal.

19. A system for indicating the phase relationship between a signal of reference phase and a signal whose phase is subject to variation, comprising a signal shaping circuit for converting the signal whose phase is subject to variations into a pulse waveform of the same frequency, a cathode ray tube indicator, beam deflection means for said indicator for deflecting the electron beam thereof in a first direction in synchronism with the signal of reference phase and in a second direction normal to the first direction at a frequency low relative to that of the signal of reference phase, and means for intensity modulating the electron beam of said cathode ray tube indicator in response to output from said signal shaping circuit.

20. In an object detecting and locating system having a plurality of coplanar receiving transducers and means to display the location of an object with reference to said coplanar receiving transducers as a function of the phase difference in signals generated by at least two of said coplanar receiving transducers in response to signals from said object, a separate receiving channel between each of said transducers and said display means, each including converter means including an oscillator to detect and translate the output from one of said transducers to a frequency other than the frequency of the signal generated by said transducer, said translated frequency being different for each of said receiving channels, means to detect the difference frequency of two translated frequencies, means to apply said difference frequency to said display means to be displayed thereon, means to detect oscillations having a stable frequency from the oscillators of said converter means and which oscillations have the same frequency as the difference in said translated frequencies, means to generate a sweep voltage responsive to said oscillations having a stable frequency, and means to apply said sweep voltage to said display means.

References Cited in the file of this patent

UNITED STATES PATENTS

| | | |
|---|---|---|
| 2,424,796 | Carlson | July 29, 1947 |
| 2,433,681 | Blumlein | Dec. 30, 1947 |
| 2,433,804 | Wolff | Dec. 30, 1947 |
| 2,510,692 | Goddard | June 6, 1950 |